United States Patent
Way et al.

(10) Patent No.: US 6,835,800 B2
(45) Date of Patent: Dec. 28, 2004

(54) NYLON COPOLYMERS CONTAINING DIMERIC ACID COMONOMERS

(75) Inventors: Tun-Fun Way, Hsinchu (TW); Cheng Yeh, Hsinchu (TW); Hsiang-In Tang, Hsinchu (TW); Lien-Tai Chen, Taoyuan (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 10/325,866

(22) Filed: Dec. 23, 2002

(65) Prior Publication Data

US 2003/0135018 A1 Jul. 17, 2003

(30) Foreign Application Priority Data

Dec. 26, 2001 (TW) ........................................ 90132422 A

(51) Int. Cl.$^7$ .............................................. C08G 69/26
(52) U.S. Cl. ........................ 528/310; 528/322; 528/323; 528/335; 528/336; 528/339; 528/339.3; 528/340
(58) Field of Search .................................. 528/310, 322, 528/323, 335, 336, 339, 339.3, 340

(56) References Cited

U.S. PATENT DOCUMENTS

| | | | | |
|---|---|---|---|---|
| 4,810,772 A | * | 3/1989 | Leoni et al. ............. | 528/339.3 |
| 5,162,490 A | * | 11/1992 | Drawert et al. .......... | 528/339.3 |
| 5,194,578 A | * | 3/1993 | Anton ....................... | 528/349 |
| 5,723,569 A | * | 3/1998 | Sato et al. ................. | 528/310 |
| 6,093,788 A | * | 7/2000 | Born et al. ................ | 528/310 |
| 6,194,537 B1 | * | 2/2001 | Raue et al. ................ | 528/310 |
| 6,297,345 B1 | * | 10/2001 | Okushita et al. .......... | 528/170 |

* cited by examiner

Primary Examiner—P. Hampton Hightower
(74) Attorney, Agent, or Firm—Sughrue Mion, PLLC

(57) ABSTRACT

A method for preparing a nylon 6 copolymer containing dimeric acid comonomers. The method includes reacting 80.0~99.9 mol % of caprolactam, 0.1~3.0 mol % of dimeric acid and 0.1~3.0 mol % of 2-methyl-1,5-pentadiamine in a polymerization reaction. Moreover, the invention provides a method for preparing a nylon 66 copolymer containing dimeric acid comonomers, which comprising reacting 60.0~90 mol % of hexadiacid and hexadiamine, 0.1~3.0 mol % of dimeric acid and 0.1–3.0 mol % of 2-methyl-1,5-pentadiamine in a polymerization reaction. The reaction temperature for both of the methods are at 200~280° C.

2 Claims, No Drawings

NYLON COPOLYMERS CONTAINING DIMERIC ACID COMONOMERS

BACKGROUND OF THE INVENTION

1. Field of the Invention

The present invention relates to a method for preparing nylon 6 fibers. In particular, the invention involves the preparation of nylon 6 copolymer containing dimeric acid.

2. Description of the Related Art

Nylon fiber is widely used in the manufacture of clothing, textile and other materials. In order to expand various uses of nylon products or to enhance specific characteristicss of the products, there has been extensive research in the modification of nylon fibers. For the copolymerization method for nylon, specific comonomers are usually added to nylon copolymers. While production costs are relatively high, and development time is also prolonged, this is still the direction in which most research is focused because of the distinct characteristics of the products.

Recently, there have been many reports on changing dyeing property, moisture absorbtion, hydrophobic property, control of melting point and contractibility for modifying nylon copolymers. U.S. Pat. No. 5,194,578 discloses adding 2-methyl-pentadiamine (MPMD) to the monomers of nylon 66, followed by copolymerization to obtain nylon 66 with improved moisture absorbtion, dyeing property, spinning property and fiber contractbility.

In the current trend for processes more environmental friendly, the use of natural plants as materials for monomers has been well valued. Among these, the most famous is dimeric acid, such as dimmer linoleic acid or dimeric fatty acid etc. These are carboxyl compounds extracted naturally from beans. After certain chemical processes or reactions, aliphatic dimeric compounds containing 30~40 carbon numbers are obtained. This compound contains sidechains (carbon number is 9~20). Therefore, they can be used as comonomers to modify nylon polymer. Earlier examples are disclosed in Hungarian Patent HU 8322 (1974), which teaches the addition of dimeric acid comonomer to nylon 6, followed by copolymerization to obtain a nylon 6 copolymer having low melting point. In recent years, Monsanto Co. teaches in U.S. Pat. Nos. 4,219,459 and 4,219,460, formulations used as hot melt adhesive.

Examples of polymer containing both comonomers of 2-methyl-pentadiamine (MPMD) and dimeric acid are disclosed in U.S. Pat. Nos. 5,162,490 and 4,032,549, JP Patent No. 5311099 and WO 9601866 etc. These patents mainly involve the use of polymer as ink or coating. However, both melting points of the copolymer (less than 150) and molecular weight (MW<10000) are very low.

SUMMARY OF THE INVENTION

In order to overcome the above problems, an object of the invention is to provide a novel nylon copolymer and a method for preparing the same. The nylon copolymer contains 2-methyl-pentadiamine (MPMD) and dimeric acid monomers, and it exhibits high melting point and molecular weight.

In order to achieve the above objects, there is provided a method for preparing nylon 6 copolymers containing 2-methyl-pentadiamine (MPMD) and dimeric acid as monomers. The method comprises steps of polymerizing 80.0~99.9 mole % of caprolactam, 0.1~4.0 mole % of dimeric acid and 0.1~4.0 mole % of 2-methyl-1,5-pentadiamine. The polymerization temperature is preferred at 200~280° C.

According to the method provided in the invention, the nylon 6 copolymer containing dimeric acid and 2-methyl-pentadiamine (MPMD) exhibits molecular weight greater than 20000 and melting point greater than 160° C.

A nylon 6 copolymer exhibiting even higher molecular weight (MW>30000) and melting point (>190° C.) can be obtained when the amount of caprolactam is 90.0~99.9 mol %, dimeric acid is 0.1~2.0 mol %, and 2-methyl-pentadiamine (MPMD) is 0.1~2.0 mol %.

Solvent can be added as well, such as m-cresol.

The invention also provides a method for preparing nylon 66 polymer containing both dimeric acid and 2-methyl-pentadiamine as comonomers. The method involves the reaction of 60.0~90 mol % of hexadiacid and hexadiamine, 0.1~4.0 mol % of dimeric acid and 0.1~4.0 mol % of 2-methyl-1,5-pentadiamine in a polymerization reaction at 200~280° C. The melting point of the obtained copolymer is greater than 160° C. and the molecular weight is greater than 20000.

A nylon 66 copolymer exhibiting even greater molecular weight (MW>30000) and melting point (>190° C.) can be obtained when the amount of adipic acid and hexadiamine are 90.0~99.9 mol %, dimeric acid is 0.1~2.0 mol %, and 2-methyl-pentadiamine (MPMD) is 0.1~2.0 mol %.

According to the method provided in the invention, nylon 6 polymer and nylon 66 polymer containing both dimeric acid and 2-methyl-pentadiamine (MPMD) comonomers are obtained. The nylon polymers exhibit high melting points and high molecular weights. In addition, using natural plant extracts as the material, the method provided in the invention is more environmentally friendly than conventional methods.

The present invention will become more fully understood from the detailed description given hereinbelow and the accompanying drawings, given by way of illustration only and thus not intended to be limitative of the present invention.

DETAILED DESCRIPTION OF THE INVENTION

Preferred Embodiments $1^{st}$ Embodiment: Synthesis of Nylon 6 Copolymer (Comonomer Dimeric Acid=0.8 mole; MPMD=0.8 mole)

22.14 mole of caprolactam, 0.80 mole of 2-methyl pentane-1,5-diamine (MPMD), 0.8 mole of dimeric acid, 5.00 mole of $H_2O$, 0.25 ml of antifoam, and 0.25 ml of hyperphosphoric acid were placed in a 5 L reactor at room temperature, and the mixture was blended evenly. After 30 minutes, the temperature ramp was 0.5° C./min until 245° C. was reached. The temperature was maintained at 245° C. After 6 hours when the torque reached a predetermined value, the mixture was removed and cut into pieces.

Data of the nylon 6 copolymer obtained; [—NH2]: 51.85 meqv./g; [—COOH]: 61.36 meqv./g; Mw: 38096 (tested with GPC, the temperature was 30° C., solvent was m-cresol, molecular weight of polystyrene was used as reference); Polydispersity: 2.52; The amount of water extractable compound (Soxlet Extraction): 8.21 wt %; $T_m$: 206.2° C.; $T_d$: 427.7° C.

$2^{nd}$ Embodiment: Synthesis of Nylon 6 Copolymer (Comonomer Dimeric Acid=0.39 mole; MPMD=0.39 mole)

25.00 mole of caprolactam, 0.39 mole of 2-methyl pentane-1,5-diamine (MPMD), 0.39 mole of dimeric acid, 6.25 mole of $H_2O$, 0.30 ml of antifoam, and 0.30 ml of hyperphosphoric acid were placed in a 5 L reactor at room temperature, and the mixture was blended evenly. After 30 minutes, the temperature ramp was 0.38° C./min until 245° C. was reached. The temperature was maintained at 245° C. After 6 hours when the torque reached a predetermined value, the mixture was removed and cut into pieces.

Data of the Nylon 6 Copolymer obtained:

[—NH2]:57.54 meqv./g; [—COOH]: 65.98 meqv./g; Mw: 37500 (relative to PS standard); Polydispersity: 1.89; The amount of water extractable compound (Soxlet Extraction): 9.78 wt %; $T_m$: 219.4° C.; $T_d$: 397.0° C.

3$^{rd}$ Embodiment: Synthesis of Nylon 66 Copolymer (Comonomer Dimeric Acid=1.8 Mole; MPMD=1.8 Mole)

4.00 gmole of hexamethylene diamine, 4.00 mole of adipic acid, 0.15 mole of 1,5-diamine-2-methylpentane, 0.15 mole of dimeric acid, 1.00 mole of $H_2O$, 0.1 mole of antifoam, and 0.1 mole of hyperphosphoric acid was placed in a 2L reactor at room temperature, the mixture were blended evenly, and nitrogen was used to displace the air in the reactor. After 30 minutes, the temperature ramp was 5° C./min until 260° C. was reached. The temperature was maintained at 260° C. After 2 hours when the torque reached a predetermined value, the mixture was removed and cut into pieces.

Data of the Nylon 66 Copolymer obtained:

[—NH$_2$]: 58.72 meqv./g; [—COOH]:66.24 meqv./g; Mw:34122 (relative to PS standard); Polydispersity: 2.11; The amount of water extractable compound (Soxlet Extraction): 0.65 wt %; $T_m$: 245.8° C.; $T_d$: 442.3° C.

4$^{th}$ Embodiment: Spinning Experiment

Spinning experiment was performed with a spinning machine having 4 spinning positions. Temperature of the spin zone was 237~300° C., and temperature of the spinnerette was 250~300° C. These temperatures can be adjusted according to the melting point of the polymer. Circular spinnerette having 42 apertures was used. Speed of spinning was greater than 4500 m/min.

Physical properties of the fiber: fineness 42d/42f; intensity: 2.3~3.0 g/d; elongation 70~75%. Boiling water shrinkage was 25%~70% (adjusted according to the conditional changes of elongation and amounts of comonomers).

It is observed from the embodiments that the nylon 6 copolymer containing 2-methyl-pentadiamine and dimeric acid and nylon 66 copolymer containing 2-methyl-pentadiamine and dimeric acid obtained according to the method provided in the invention exhibit high melting points and high molecular weights. Moreover, the spinning properties of the copolymer are both excellent.

The foregoing description of the preferred embodiments of this invention has been presented for purposes of illustration and description. Obvious modifications or variations are possible in light of the above teaching. The embodiments were chosen and described to provide the best illustration of the principles of this invention and its practical application to thereby enable those skilled in the art to utilize the invention in various embodiments and with various modifications as are suited to the particular use contemplated. All such modifications and variations are within the scope of the present invention as determined by the appended claims when interpreted in accordance with the breadth to which they are fairly, legally, and equitably entitled.

What is claimed is:

1. A nylon copolymer containing dimeric acid comonomers, prepared from: about 93–97 mol % of caprolactam, about 1.5–3.5 mol % of dimeric acid and about 1.5–3.5 mol % of 2-methyl-1,5-pentadiaminine, wherein the melting point of the nylon copolymer is greater than 160° C., the molecular weight is greater than 20000, and the dimeric acid is an aliphatic acid containing a carbon number of 30–40 and a side chain structure having a carbon number of 9–20.

2. A fiber made from the nylon copolymer as claimed in claim 1, wherein the boiling water shrinkage rate is 25–70%.

* * * * *